G. A. MEACHAM.
Hand-Seeder.
No. 15.106.
Patented June 10. 1856.
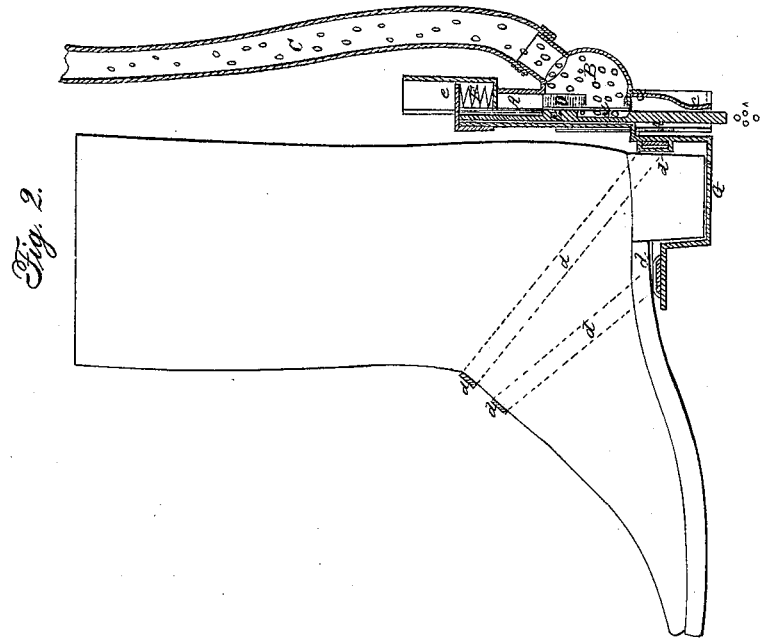
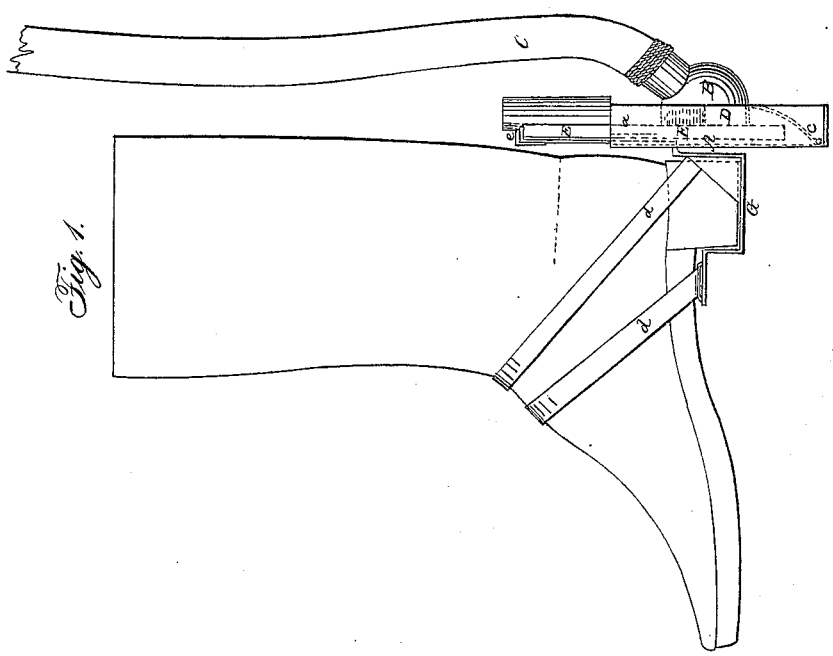

UNITED STATES PATENT OFFICE.

GEORGE A. MEACHAM, OF NEW YORK, N. Y.

IMPROVEMENT IN SEED-PLANTERS.

Specification forming part of Letters Patent No. 15,106, dated June 10, 1856.

*To all whom it may concern:*

Be it known that I, GEORGE A. MEACHAM, of the city, county, and State of New York, have invented a new and useful Foot Corn-Planter; and I do hereby declare that the following is a full, clear, and exact description of the same, reference being had to the accompanying drawings, forming part of this specification, in which—

Figure 1 is a side elevation, and Fig. 2 a vertical section, of a planter constructed after my invention applied to the foot.

Similar letters of reference in each of the two figures indicate corresponding parts.

The nature of my invention consists, first, in a machine for planting corn constructed so as to be applied to and operated by the foot, as hereinafter described.

It consists, second, in the peculiar arrangement of parts hereinafter specified, whereby a simple, cheap, and convenient machine, to be operated by the foot, is produced.

To enable others skilled in the art to make and use my invention, I will proceed to describe its construction and operation.

A represents a flat metal seed tube or box; B, a globular hopper provided on the side of the same; C, a flexible seed-conductor leading from a seed-bag secured round the waist of the farmer to the hopper, and supplying the hopper with seed.

D is a circular partition formed round the inner edge of the hopper for preventing the seed passing down between the slide and hopper. The upper half of this partition is formed of brushes and serves as a cut-off, and also allows of the seed being carried up by the slide past it without being bruised. Between the partition and the edges of the seed-tube spaces are left for the corn to run down after being carried up to the position shown in red in Fig. 1, and automatically discharged onto the circular partition, which, owing to its shape, causes it to run down through said spaces into the spring end of the tube, as illustrated in black in same figure.

E is the slide and plunger. It is arranged to move up and down in the seed-tube, with one of its faces snug up against one side of the tube, and its other face snug up against the edge of the partition D, as shown. This slide has a seed cup or cell, $a$, in its face, into which the corn falls from the hopper, as shown in red, and is confined until the slide has been raised to the position shown in Fig. 1, when it automatically discharges onto the partition, and runs down through the spaces round the partition into the spring end of the tube, from which it is forced into the soil through the spring-mouth $c$, as represented, as the plunger is lowered to the position shown in Fig. 2.

F is a spiral spring, arranged between the projection $e$ on the upper end of the plunger and the top of the tube A, for the purpose of adjusting or raising the slide after it has been depressed for the purpose just stated.

G is a step attached fast to the plunger, and moving up with it by the action of the spring and down with it by the action of the foot. This step serves for receiving the heel of the foot, and is of proper form to confine it from lateral or longitudinal play, and has straps $d$ $d$ attached to it for securing it fast on the foot, as shown in Fig. 1.

Operation: The machine being strapped to the foot, as just described, and the seed-bag fastened to the waist of the farmer and combined with the hopper, the farmer rests his foot upon the ground and exerts pressure upon the step, and thereby causes the plunger to descend, along with his foot, from the position shown in Fig. 1 to the position shown in Fig. 2, and thereby to force the seed which may be in the spring end of the tube into the soil. As soon as this occurs, he withdraws the pressure, and the slide rises by the action of the spiral spring F and carries up another hill of seed, and discharges it into the spring end of the tube, ready for the second descent of the plunger, which takes place by the action of the foot as soon as the farmer arrives at the next hill.

What I claim as my invention, and desire to secure by Letters Patent, is—

1. A machine for planting corn, constructed so as to be applied to and operated by the foot, substantially as set forth.

2. The employment of the self-adjusting step G, applied in connection with the plunger and slide E, seed tube or box A B D, and flexible seed-conductor C, substantially as and for the purpose set forth.

G. A. MEACHAM.

Witnesses:
 WM. TUSCH,
 JAMES F. BUCKLEY.